Patented Aug. 10, 1954

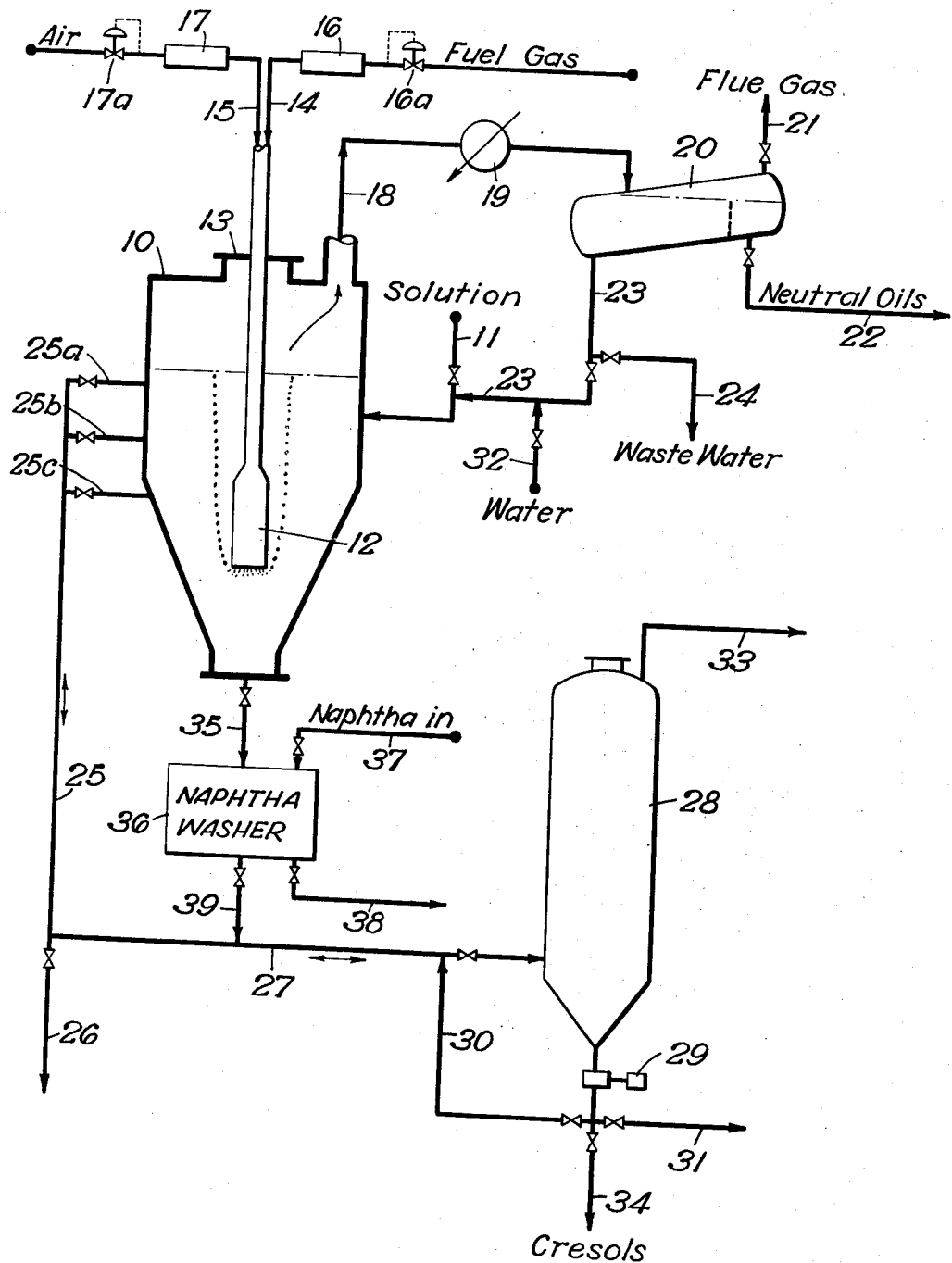

2,686,105

UNITED STATES PATENT OFFICE 2,686,105

PROCESSING WASTE CAUSTIC CRESYLATE SOLUTIONS

Richard E. Dickey, Independence, and William A. Weaverling, Kansas City, Mo., assignors to Standard Oil Company, Chicago, Ill., a corporation of Indiana Application December 26, 1950, Serial No. 202,784

11 Claims. (Cl. 23—63)

This invention relates to the processing of aqueous waste caustic solutions and to the recovery therefrom of cresylic acids of petroleum origin. More particularly the invention pertains to an improved process for substantially complete recovery of purified cresylic acids from aqueous caustic refinery waste streams containing cresols, mercaptans and neutral oils.

It has long been known that acidifying a caustic waste liquid used in the extraction of "cresols" from petroleum fractions will produce a "petroleum cresylic acid" comprising primarily cresols but including phenols and other high molecular weight phenolic compounds such as xylenols. Such cresylic acids are usually characterized by the presence of a considerable number of impurities, chiefly neutral oils and sulfur compounds such as thiols or mercaptans which make them unsuitable for many purposes. It has heretofore been proposed to separately steam the waste caustic to remove neutral oil, then air blow the steamed solution to convert thiols to disulfides, remove the produced disulfides from the solution, separately "spring" the solution with mineral acids to liberate the cresylic acids, and finally to vacuum distil the liberated cresylic acids. It is, therefore, an object of our invention to provide an improved method of recovering petroleum cresylic acids and alkali carbonates from aqueous waste caustic solutions which is more simple, less expensive, and generally more satisfactory than processes heretofore employed.

Another object of the invention is to provide an improved method and means for disposing of odorous caustic refinery wastes, particularly those containing organic contaminants such as mercaptans and cresylates. An additional object is to obtain petroleum cresylic acids of lower neutral oil content than was obtainable in prior processes.

A more specific object of our invention is to avoid the necessity of separate steaming, air blowing, and acidifying steps. A further object is to provide an integrated process for treating waste caustic solutions to effect removal of neutral oils, conversion of thiols to disulfides and liberation of purified cresylic acids to leave a residual material substantially free of organic contaminants. These and other objects of the invention will be apparent as the detailed descrpition thereof proceeds.

The caustic cresylate solutions which are processed according to our invention may, for example, be obtained by the treatment of cracked naphthas or heater oils with an aqueous caustic solution containing considerable excess alkalinity, having a pH of about 13. In practicing our invention we partially neutralize the spent caustic cresylate solution by carbonation with hot flue gases generated by submerged combustion in the cresylate solution. The combustion gases comprise carbon dioxide and preferably some free oxygen. The neutralization is carried to a pH in the range of 11 to 12.5, a pH approximating 11 being just short of the amount required for initiating springing of the cresols. This partial neutralization may require about 50 to 70 percent of the total amount of the acidic gases required for the complete springing. Apparently any free cresylic acid which may be present under these conditions is solutized and hence dissolved in the aqueous caustic cresylate.

Research and commercial operations have demonstrated that the susceptibility of thiols or mercaptans to oxidation to the disulfides by the oxygen-containing combustion gas is increased by the partial neutralization of the original caustic cresylate solution to a pH in the range of about 11 to 12.5. We have discovered that our simultaneous heating, gradual partial neutralization, and oxidation of the aqueous solution of crude caustic cresylates effects a substantial conversion of thiols or mercaptans to disulfides before the cresols are liberated by carbonation. The carbon dioxide initially effects conversion of excess NaOH to $Na_2CO_3$, thus lowering the pH from 13 to about 11 to 12.5 and the free oxygen oxidizes thiols to disulfides. A substantial amount of the disulfides may be removed as a separate layer from the aqueous caustic cresylate solution, particularly after the removal of the large amounts of neutral oils which we distil from the solution incident to the partial carbonation; more complete removal of disulfides can be obtained by washing with an organic solvent such as a light hydrocarbon. The conversion of the mercaptans to removable disulfides is increased by adding water to the solution during the contacting with the hot combustion gases. This avoids any substantial net concentration and delays the springing of cresols until after the disulfides are removed. Continued contact of the solution, preferably after removal of the disulfides, causes further carbonation to take place and with the resultant decrease in pH the cresylic acids are liberated as a separate immiscible organic phase.

In practicing our invention, we generate in heat exchange with the solution a hot combustion gas including carbon dioxide and oxygen and contact the caustic solution directly with the hot combustion gases to partially neutralize the solution to a pH of about 11. The partially neutralized aqueous caustic cresylate is simultaneously oxidized by the excess oxygen introduced during the contacting with the hot submerged-combustion gases, thereby converting mercaptans and thiols to disulfides. The contacting with the hot submerged-combustion gases and the free oxygen may be continued until the mercaptan number is reduced to not more than about 30 and is preferably extended to obtain a substantially zero mercaptan number. Such conversion to disulfides at the defined pH range can be effected in a relatively short time, of the order of two to ten hours, after the solution reaches the boiling point. By using an oxidation catalyst such as nickel cresylate, nickel hydroxide, nickel sulfide, etc., or other known types of oxidation catalysts, the time required for substantially complete conversion of the mercaptans to disulfides may be further decreased, thereby permitting removal of the organic sulfur before the carbonation springs the cresols.

The hot submerged combustion gases generated within the caustic extract solution raises the temperature of the solution to its boiling point and steam is driven off. The action of the steam generated in the solution serves to distil the neutral oils from the solution during the conversion of the mercaptans to disulfides and the partial acidifying of the solution by carbonation. When the desired extent of conversion to disulfides has been effected, the passage of the combustion gases into the solution may be stopped and two layers allowed to separate by settling. The supernatant organic layer contains the disulfides and can be withdrawn from the system. Unseparated disulfides may be scrubbed from the solution by means of an organic solvent such as a hydrocarbon oil. The passage of hot combustion gases through the residual solution from which the disulfides have been removed is then resumed for completing the carbonation of the solution and the liberation of the cresylic acids.

Water is continuously added to the caustic solution during the carbonation period during which springing is effected in order to maintain the concentration of the solution approximately constant. Such water may comprise condensate recovered from the system. The return or introduction of water is necessary throughout the carbonation period, since evaporation proceeds more rapidly than carbonation. When the cresylic acids have been liberated (as determined by sampling) the passage of the submerged-combustion gases into the solution is again stopped and the two layers allowed to separate by settling. The liberated cresols which accumulate in an upper immiscible phase are removed before final concentration. The carbonation period may require between about 8 and 10 hours, and ultimate concentration to a solid salt residue comprising sodium carbonate requires an additional two or three hours. The solid or crystalline residue which remains upon completion of the evaporation is substantially uncontaminated by cresylic acids and is removed manually from the contacting vessel.

Heretofore the disposal of the contaminated crystalline salts resulting from the ultimate concentration of the aqueous caustic solution has been difficult in view of the fact that sulfides and cresylic acids are considered by public health authorities to be particularly undesirable for discard to public waters. However, by our procedure stream pollution is alleviated because the salt liquor or solid salts remaining after the cresols and neutral oils have been removed are not obnoxious contaminants, the chemical compounds which remain being present in natural waters. In fact, the resulting carbonate salts may be used in water treatment systems.

The invention will be more clearly understood from the following detailed description when read in conjunction with the accompanying drawing which forms a part of this specification and which is a flow diagram illustrating apparatus for practicing our invention.

As a first example, we will describe the treatment of a crude caustic cresylate solution obtained by extraction of heater oils and containing about 18.6 weight per cent sodium hydroxide, 2.2 weight per cent sodium sulfide, .4 weight per cent sodium chloride and 18.7 liquid volume per cent cresols along with solutized neutral oil. In this example, the thiol content of the waste caustic solution was relatively low and no step of separating initially formed disulfides was performed prior to the springing of the cresols. This crude caustic cresylate solution is charged to a contacting vessel 10 by line 11.

A preheated submerged combustion burner 12 is lowered into the vessel 10 via manhole 13 and hot combustion gases are discharged from the burner directly into the caustic extract solution.

The construction of the submerged combustion burner 12 consists of three essential parts, a mixing chamber which will produce a homogeneous gas-air mixture, a flame arrester which may comprise a velocity tube through which the gaseous-air mixture flows at a rate greater than the rate of flame propagation, and a combustion chamber containing a refractory surface which becomes incandescent and acts as an ignition point for the gas-air mixture. (A submerged combustion apparatus of this general type is described in Industrial and Engineering Chemistry (September 1933), page 984 et seq.) An unglazed porcelain or zirconia tube is satisfactory for the refractory surface and has been found to glow brilliantly in the combustion zone and keep the flame continuously ignited. Adequate insulation between the combustion tube and an outer metal jacket is important. This insulating material may be diatomaceous earth or other finely divided refractory substance. We have found that a burner constructed in this manner remains ignited throughout the ten to twelve hour carbonation and evaporation periods.

Before submerging the burner 12 into the solution, it is preheated for about ten minutes in air to bring the combustion zone refractory liner to a cherry red. The quantity of gas and air supplied by valved lines 14 and 15 to the burner is measured by flow-meter means 16 and 17 adjusted to a heat input of about 900 B. t. u. per hour per gallon of solution charged to the contactor 10. An excess of air of between about 10 and 20 per cent, preferably about 12 to 15 per cent, is supplied so that both free oxygen and combustion gases may be introduced into the contactor 10.

As the heating progresses the temperature of the aqueous caustic solution is increased to its boiling point and neutral oils together with some water vapor are withdrawn overhead from the contactor 10 via line 18 and condenser 19 to separator 20. From this separator flue gases are withdrawn via line 21, neutral oils via line 22, and water via line 23. Ordinarily the condensate water from separator 20 may be recycled to the concentrator 10 via line 11 except during the utimate concentration step when it may be discarded by valved line 24.

The submerged-combustion gases discharged into the solution comprise nitrogen, carbon dioxide, steam and free oxygen together with a small amount of carbon monoxide. The temperature is maintained at the boiling point of the caustic cresylate solution and at atmospheric or slightly superatmospheric pressure for a period sufficient to "carbonate" the solution to about pH 9, i. e. to a pH low enough to effect springing or liberation of cresylic acid as a separate phase. During the liberation or springing step, it is necessary to return condensate from separator 20 via lines 23 and 11 or to add water via line 26 throughout the carbonation period of between about eight and ten hours because evaporation of water from the solution proceeds more rapidly than carbonation. Sufficient water should be maintained in the solution to prevent the boiling temperature from exceeding about 300° F. and to facilitate the subsequent separation of the cresol phase. Dilute caustic cresylate solution, introduced by line 11 as condensate is collected, may comprise the source of added water and is advantageous in this case since it is desirable that the cresol content be high in the springing step.

Although agitation is violent and the hot gases from the burner 12 are finely dispersed, the submerged combustion conversion offers no difficulty with foaming.

When the cresylic acids have been liberated, the passage of the combustion gases into the solution is interrupted and the liberated cresols accumulate in an upper immiscible phase which can be withdrawn to the desired level via lines 25a, 25b or 25c before final concentration of the salts in treater 10.

The withdrawn cresols are transferred via lines 25 and line 27 into separator 28. In this separator the small amount of aqueous caustic solution withdrawn with the liberated cresylic acids is allowed to separate by settling into two layers; the lower layer comprising the caustic solution is withdrawn via pump 29 and returned via lines 30, 27 and 25 to the convertor 10 for further and ultimate concentration.

Ultimate concentration of solid residue is obtained in this case containing .2 weight per cent sodium chloride, .2 weight per cent sodium sulfate and 34.9 weight per cent sodium carbonate contaminated by a very minor amount of cresols, such solid residue being in contact with a mother liquid containing 1.2 weight per cent sodium chloride, 1.0 weight per cent sodium sulfate and 19 weight per cent sodium carbonate with a very small amount of cresols.

The cresylic acids remaining in separator 28 can then be distilled under vacuum from vessel 28 or can be withdrawn via pump 29 and valved line 31 for storage or further purification and/or processing.

In this example, the properties of the crude cresylic acid and purified cresylic acids obtained therefrom were as follows:

|  | Crude Cresylic Acid | Purified Cresylic Acids | | |
| --- | --- | --- | --- | --- |
|  |  | F Grade | G Grade | High Boiling |
| Yield, Wt. Percent on Crude Acid |  | 21.3 | 30.0 | 21.9 |
| Water, Vol. Percent | 3.0 | 0.3 | 0.3 |  |
| Sulfur, Wt. Percent | 0.73 | 0.50 | 0.59 |  |
| Density, 60° F./60° F | 1.090 | 1.016 | 1.020 |  |
| Tar Acids, Vol. Percent | 77.0 | 99.2 | 97.7 |  |
| Neutral Oils, Vol. Percent | 2.1 | 0.5 | 2.0 |  |
| Molecular Weight |  | 129 | 146 |  |
| Refractive Index, $N_D^{20}$ |  | 1.5385 | 1.5412 |  |
| Distillation | (1) | (2) | (2) | (2) |
| IBP, ° F | 410 | 385 | 400 | 418 |
| EP, ° F | 671 | 492 | 542 | 580 |

[1] ASTM Method D246-42.
[2] ASTM Method D86-46.

It should be noted that the F grade cresylic acid contained 99.2 volume per cent of tar acid and only .5 volume per cent of neutral oil. The sulfur content of the cresylic acids in this case is lower than that of many petroleum cresols currently marketed and it can be lowered much further by employing an initial disulfide removal step as will be described in the following example.

As a second example of our process, we will describe the treatment of a spent caustic solution obtained from the extraction of a high sulfur cracked naphtha boiling chiefly in the range of 200° to 400° F. and containing substantial amounts of thiols (thio-cresols and mercaptans). In this case the crude solution initially contains about 25 weight per cent of sodium hydroxide but the caustic concentration is not critical and may be in the range of 10 to 50 weight per cent or more (i. e. NaOH both in free and combined state). This spent caustic solution contains cresylic acids in the form of caustic cresylates, mercaptans in the form of mercaptides, and solutized neutral oil. In this case, the initial treatment by submerged combustion is substantially the same as described in connection with the previous example except that it is of greater importance that excess air be discharged into the solution along with combustion gases and in this case the initial treatment with submerged combustion and excess oxygen-containing gas is terminated when the pH of the solution is lowered to a value in the range of 11 to 12.5, i. e. a value just above that at which cresylic acids are liberated. The extent to which mercaptans have been converted to disulfides is determined by sampling and obtaining mercaptan copper numbers. It is desirable that the copper number be as low as possible. The initial spent caustic solution may have a copper number upwards of 3000 and it is desirable that the copper number be reduced to a value below 30 and preferably below 1. If the copper number is still unduly high when a pH is reached at which cresylic acids might separate, the fuel component to the burner should be cut off and introduction of the air component should be continued until the conversion of mercaptans to disulfides is substantially completed. At this point, the introduction of both fuel, gas and air is terminated and the liquids in the contacting vessel are allowed to stratify.

The supernatant organic layer which contains most of the disulfides may then be withdrawn from contacting vessel 10 by one of lines 25a, 25b or 25c and introduced by line 27 to auxiliary separator 28. In this auxiliary separator, any aqueous caustic solution withdrawn with the disulfides is allowed to separate by settling and the lower layer of caustic solution is returned by pump 29 and lines 30, 27 and 25 to convertor 10.

While the skimming of disulfides as above described may remove most of the disulfides formed in the initial treating step, a considerable portion of the disulfides are solutized in the aqueous caustic cresylate solution. When it is desired to produce cresylic acids of exceptionally low sulfur content, the aqueous caustic solution after the skimming step should be thoroughly washed with an organic solvent such as light naphtha. This washing may be effected in the contacting vessel 10 or the total solution may be withdrawn from the contacting vessel via line 35 to a washing zone 36 into which a solvent for disulfides, such as light naphtha, may be introduced by line 37 and the disulfide-laden solvent can be withdrawn by line 38, the washed aqueous solution then being returned by lines 39 and 27 to contacting vessel 10.

After removal of the disulfides from the aqueous caustic solution, the burner 12 is again preheated as above described and re-submerged in the remaining caustic cresylate solution to acidify said solution by carbonation to the extent required for liberating the cresols which may then be removed in the manner described in the first example.

By the above procedure, cresylic acids are obtainable with exceptionally low sulfur contents and the residual carbonates are substantially free of organic contaminants.

The use of excess air or oxygen-containing gas is in all cases desirable at least in the initial portion of the submerged combustion treatment in order to avoid the discharge of foul-smelling mercaptan vapors into the atmosphere. In other words, our invention not only solves the stream pollution problem by converting caustic wastes mostly to substantially solid form and to a composition which is unobjectionable, but it also avoids air pollution by minimizing the liberation of mercaptan vapors. Thus, mercaptan-containing spent caustic solution can be advantageously treated by submerged combustion even though it contains an insufficient amount of cresols to warrant their recovery.

Although we have described our invention in terms of specific examples which are set forth in considerable detail, it should be understood that these are by way of illustration only and that the invention is not limited thereto. Alternative refinery waste streams and operating techniques will be apparent to those skilled in the art in view of our disclosure.

We claim:

1. In a process for treating crude aqueous caustic solutions containing dissolved organic contaminants comprising mercaptans and cresylates, the steps which comprise generating a hot combustion gas in heat exchange with the solution, discharging the hot combustion gas into the solution, thereby contacting the caustic solution directly with hot combustion gases including carbon dioxide and free oxygen, and vaporizing some water therefrom, introducing liquid water to the caustic solution to substantially maintain the initial water content of the caustic solution, continuing the contacting of the solution with the hot combustion gases while adding such water until the solution is acidified by carbonation to a pH below about 11 and a separate organic liquid phase containing substantially all of said organic contaminants is produced, and separating the said organic phase from the aqueous solution.

2. A method of treating a crude aqueous caustic solution containing mercaptans and cresylates as organic contaminants which method comprises generating a hot combustion gas in heat exchange with said solution, said combustion gas consisting essentially of carbon dioxide and containing free oxygen, contacting the caustic solution directly with the hot combustion gases by discharging said gases into said solution whereby water is vaporized from said solution, introducing liquid water to said solution at a rate sufficient to substantially maintain the initial water content of the contacted solution, continuing the contacting of the solution with the hot combustion gases and the introducing of water until the pH of the solution is lowered to a value in the range of 11 to 12.5 and a separate organic disulfide liquid phase is produced, and separating said organic disulfide liquid phase from the aqueous solution.

3. The process of claim 2 which includes the steps of continuing the contacting of the solution with hot combustion gases until the solution is acidified by carbonation to a pH below about 11 and a separate organic liquid cresylic acid phase is produced, and separating said organic liquid cresylic acid phase from the aqueous solution.

4. In a process for treating a crude caustic cresylate solution comprising cresols, neutral oils and water, the steps which comprise generating a hot combustion gas including carbon dioxide by submerged combustion below the surface of the solution, contacting the caustic cresylate solution directly with the generated hot combustion gases for a time sufficient to distil substantially all of the neutral oils and some water from the solution, introducing liquid water to the caustic solution to replace at least a part of the water vaporized therefrom, continuing the contacting of the solution with the hot combustion gases until the solution is acidified by carbonation to a pH below about 11 whereby the cresols are liberated from solution, and separating the liberated cresols from the caustic solution.

5. The method of claim 4 wherein the introduced water comprises at least a part of the separated water.

6. The method of claim 4 wherein the introduced water comprises a dilute crude cresylate solution.

7. In a process for treating crude aqueous caustic solutions containing neutral oils and cresols as contaminants, the steps which comprise generating in heat exchange with the solution a hot combustion gas including carbon dioxide and free oxygen, discharging the hot combustion gas into the solution at a rate sufficient to effect a heat input of about 900 B. t. u. per gallon of solution, contacting the caustic solution directly with the discharged hot combustion gases for a time sufficient to distil substantially all neutral oils and some water from the solution, introducing liquid water to the caustic solution to replace water distilled therefrom, continuing the contacting of the solution with the hot combustion gases until the solution is acidified by carbonation to a pH below about 11 and an organic liquid phase containing liberated cresols, is produced, collecting the said organic phase as a supernatant layer, and separating the said layer from the aqueous solution, said aqueous solution being substantially free of organic materials.

8. The method of obtaining cresols and recovering uncontaminated solid residue from a crude caustic waster cresylate solution containing cresylates, mercaptides and neutral oils, which method comprises contacting the solution with a hot combustion gas generated by submerged combustion in said solution and containing carbon dioxide and free oxygen, continuing the contact for a time sufficient to convert mercaptides contained therein to disulfides while maintaining the pH of the solution above about 11, separating from said solution a first supernatant organic phase containing disulfides, removing an overhead fraction comprising neutral oils and water, separating a recycled water stream from said overhead fraction, reintroducing the recycled water to the partially acidified solution, contacting the solution with additional quantities of hot combustion gases containing carbon dioxide while maintaining the aqueous content thereof about constant by the reintroduction of said recycled water, continuing the contacting with hot combustion gases until the solution is acidified to a pH of below about 10 by carbonation thereby liberating cresylic acids, interrupting the contacting and separating a second supernatant organic phase containing the liberated cresylic acid, recovering the said second organic phase from the residual solution, discontinuing the introduction of water to said solution, and contacting the residual solution with additional hot combustion gases until solid salts are formed.

9. The method of treating a spent caustic solution containing thiols and obtained from the refining of hydrocarbon distillates with aqueous alkali metal hydroxide solutions, which method comprises burning a combustible gas with oxygen in a burner submerged in such a spent caustic solution which initially has a pH of approximately 13, whereby the combustion gases effect agitation of said solution, the heat of combustion causes a boiling of said solution, and the carbon dioxide produced by combustion partially neutralizes the caustic solution, and continuing said submerged combustion until the hydrogen ion concentration of the caustic solution is reduced to a level of approximately pH 12 while introducing oxygen in excess of that required for burning the combustible gas whereby said mercaptans are converted to disulfides.

10. The method of claim 9 wherein the spent caustic solution contains caustic cresylate, which method includes the steps of separating at least a part of the disulfides from the solution while the hydrogen ion concentration of said solution is not lower than pH 11, resuming the submerged combustion in the presence of added water to effect springing of cresols from caustic cresylate, and separating said cresols from the remaining aqueous solution.

11. In a process for treating a crude caustic cresylate solution comprising cresols, mercaptans, neutral oils and water and having a pH above about 11, the steps which comprise generating a hot combustion gas including carbon dioxide and free oxygen by submerged combustion in the solution, contacting the caustic cresylate solution directly with the generated hot combustion gases for a time sufficient to distil neutral oils and some water from the solution and to convert the mercaptans to disulfides, separating disulfides from the caustic cresylate solution, introducing water to the caustic solution during the contacting with combustion gases to maintain substantially the initial dilution, continuing the contacting of the solution after removal of the disulfides with the hot combustion gases until the solution is acidified by dissolved carbon dioxide to a pH below about 11 whereby the cresols are liberated from the solution, and separating the liberated cresols from the caustic solution.

References Cited in the file of this patent

UNITED STATES PATENTS

| Number | Name | Date |
|---|---|---|
| 725,786 | Smethurst | Apr. 21, 1903 |
| 1,199,271 | Hawley | Sept. 26, 1916 |
| 1,409,588 | Runge | Mar. 14, 1922 |
| 1,716,433 | Ellis | June 11, 1929 |
| 2,040,096 | Miller | May 12, 1936 |
| 2,086,902 | Doennecke et al. | July 13, 1937 |
| 2,150,656 | Lounsbury | Mar. 14, 1939 |
| 2,352,594 | August | July 4, 1944 |
| 2,617,833 | Kalichevsky et al. | Nov. 11, 1952 |
| 2,635,120 | Alm | Apr. 14, 1953 |